(12) United States Patent
Kiefer et al.

(10) Patent No.: US 11,856,943 B2
(45) Date of Patent: Jan. 2, 2024

(54) CONTROL SYSTEM, AGRICULTURAL UTILITY VEHICLE AND METHOD FOR CONTROLLING AN AGRICULTURAL UTILITY VEHICLE

(71) Applicants: Amazonen-Werke H. Dreyer GmbH & Co. KG, Hasbergen-Gaste (DE); Hydac Systems & Services GmbH, Sulzbach (DE)

(72) Inventors: Timo Kiefer, Saarlouis (DE); Georg Komma, Sankt Ingbert (DE); Frank Grosse Prues, Bersenbrück (DE)

(73) Assignees: AMAZONEN-WERKE H. DREYER SE & CO. KG; HYDAC SYSTEMS & SERVICES GMBH

( * ) Notice: Subject to any disclaimer, the term of this patent is extended or adjusted under 35 U.S.C. 154(b) by 1031 days.

(21) Appl. No.: 16/491,793

(22) PCT Filed: Mar. 7, 2018

(86) PCT No.: PCT/EP2018/055580
§ 371 (c)(1),
(2) Date: Sep. 6, 2019

(87) PCT Pub. No.: WO2018/162539
PCT Pub. Date: Sep. 13, 2018

(65) Prior Publication Data
US 2021/0127657 A1 May 6, 2021

(30) Foreign Application Priority Data
Mar. 8, 2017 (DE) ..................... 10 2017 104 844.8

(51) Int. Cl.
*A01M 7/00* (2006.01)
*A01C 23/04* (2006.01)
(Continued)

(52) U.S. Cl.
CPC ............ *A01M 7/0057* (2013.01); *A01B 73/04* (2013.01); *A01C 7/10* (2013.01); *A01C 23/047* (2013.01);
(Continued)

(58) Field of Classification Search
CPC . A01M 7/0057; A01M 7/0075; A01C 23/047; A01C 7/10; A01B 73/04
See application file for complete search history.

(56) References Cited

U.S. PATENT DOCUMENTS

| | | |
|---|---|---|
| 2011/0282554 A1 | 11/2011 | Keye |
| 2013/0299601 A1 | 11/2013 | Ballu |

(Continued)

FOREIGN PATENT DOCUMENTS

| | | |
|---|---|---|
| DE | 4140254 A1 | 6/1993 |
| DE | 10349325 A1 | 5/2005 |

(Continued)

OTHER PUBLICATIONS

Examination report for DE Application No. 10 2017 104 844.8, dated Nov. 20, 2017.
International Search Report dated May 28, 2018 in corresponding PCT Patent Application No. PCT/EP2018/055580.

*Primary Examiner* — Tuongminh N Pham
(74) *Attorney, Agent, or Firm* — Mintz, Levin, Cohn, Ferris, Glovsky and Popeo, P.C.

(57) ABSTRACT

A control system for an agricultural utility vehicle includes a distributor linkage for applying fertilizer, plant protection agents, or seed, the distributor linkage having a center part and two lateral extension arms. The center part is arranged so that it can be moved along a vertical axis to adjust the height of the distributor linkage. At least three sensors for determining the distance between the center part and a respective extension arm to the ground are assigned to the distributor linkage, and the system includes a data process- (Continued)

ing unit such that signals from the sensors are processed as actual values to generate an actuating signal for a hydraulic device is generated for adaptation to a target distance.

20 Claims, 4 Drawing Sheets

(51) Int. Cl.
    *A01C 7/10* (2006.01)
    *A01B 73/04* (2006.01)
(52) U.S. Cl.
    CPC ........ A01M 7/0075 (2013.01); A01M 7/0089 (2013.01)

(56) References Cited

U.S. PATENT DOCUMENTS

2013/0345937 A1* 12/2013 Strelioff ............... A01D 41/141
                                                              701/50
2014/0074360 A1   3/2014 Rosa et al.
2016/0262370 A1   9/2016 Leeb

FOREIGN PATENT DOCUMENTS

| DE | 202007011631 U1 | 10/2007 |
|----|-----------------|---------|
| EP | 1 444 894 A1    | 8/2004  |
| EP | 2186405 A1      | 5/2010  |
| WO | 2008/098290 A1  | 8/2008  |
| WO | 2016128577 A1   | 8/2016  |

* cited by examiner

CONTROL SYSTEM, AGRICULTURAL UTILITY VEHICLE AND METHOD FOR CONTROLLING AN AGRICULTURAL UTILITY VEHICLE

The invention refers to a control system for an agricultural utility vehicle according to the preamble of patent claim 1. Furthermore, the invention refers to an agricultural utility vehicle according to claim 13, as well as a method for controlling an agricultural utility vehicle according to claim 14.

Such systems are used for agricultural vehicles for the application of materials such as fertilisers, plant protection products or seed. In order to spread the material efficiently and over a large area on the field soil to be worked, the agricultural utility vehicles have a distributor linkage with several spray nozzles. The distributor linkage extends transversely to the direction of travel and can have working widths of up to 40 m. The spray nozzles, which are mounted at regular intervals on the distributor linkage, are used for applying the material on the ground to be worked. The distance between the distributor linkage and the ground should remain as constant as possible over the entire working width of the distributor linkage. This means that the distributor linkage shall be kept as parallel as possible to the ground to be worked.

As is well known, the distributor linkage has a centre part, which can for example be formed by a centrally located frame. The centre part is connected to two lateral extension arms with a plurality of linkage sections connected by joints, which can be folded in to each other in transport position and folded out in working position. The individual linkage sections can be pivoted about vertical axes via the corresponding joints and are therefore rotatably mounted about the respective vertical axis. The distributor linkage can thus be transferred from a space-saving transport position when folded in to a working position with full working width.

Such a distributor linkage is known as an example from EP 21 86 405 A1. The individual linkage sections can be pivoted about a horizontal axis and, in addition to the pivoting process of the individual linkage sections, the centre part is arranged so that it can be moved along a vertical axis. This makes it possible to adjust the height of the extension arms.

To control the pivoting, a plurality of sensors are mounted on the individual linkage sections, which are in indirect contact with the ground surface. The sensors, which can be designed as optical sensors for example, detect an actual value which is formed by the relative distance to the ground surface. Furthermore, sensors, such as angle position sensors, can be arranged on the individual linkage sections in order to detect a relative position between the individual linkage sections. The currently detected actual values with respect to the distance of the respective linkage section from the ground surface and the relative position of the individual linkage sections are transmitted to a data processing unit. The data processing unit can compare the detected actual values with already stored or user-defined target values. This can be used to output control signals for hydraulic devices which are assigned to the individual linkage sections. The individual hydraulic devices can be used to change the setting positions of the individual linkage sections or extension arms. The change of the setting positions of an individual linkage section is not done absolutely on the value of the associated sensor of the linkage section, but always in relation to the position of the other linkage sections and their associated sensors.

As it is known that the distributor linkage can also be resiliently connected to the utility vehicle, driving the utility vehicle over uneven ground can lead to a change in the height of the entire distributor linkage relative to the ground surface. The outer ends of the extension arms are also raised or lowered, since they are directly connected to the centre part. In the case of a fixed target value specification, both for the individual linkage sections and for the entire distributor extension, the data processing unit individually controls the bending and angling of the extension arms as well as the height adjustment of the distributor linkage. It can happen that both the centre part and one or a plurality of linkage sections do not have the required target distance and therefore the centre part and the linkage section(s) are simultaneously adjusted in height or inclination to set the desired nominal value. In particular, a counterproductive control of the various elements can be observed here, for example in the event of an abrupt lowering of the entire distributor linkage with abrupt and rapid changes in the distance to the ground, it can happen that first of all both the centre part and the extension arms are controlled in such a way that the distance to the ground is increased. However, since the lateral linkage sections are attached to the centre part, they usually have to be lowered again after the centre part has reached the target distance. This can also happen, for example, when changing between the field soil to be cultivated and the headland, if a different target distance is set for the turning manoeuvre in the headland than for the working manoeuvre in the field.

The invention is therefore based on the object of providing a control system for an agricultural utility vehicle that can be adapted to different ground contours as quickly and precisely as possible. The invention is also based on the object of providing an agricultural utility vehicle and a method for controlling an agricultural utility vehicle.

According to the invention, this object is solved by a (closed-loop) control system comprising the features of claim 1. With regard to the agricultural utility vehicle, the object is solved by the subject matter of claim 13. Furthermore, with regard to the method, the object is solved by the subject matter of claim 14.

The invention is based on the idea of providing a control system for an agricultural utility vehicle comprising a distributor linkage for applying material such as fertiliser, plant protection agents or seed, which extends transversely to the direction of travel and has a centre part and two lateral extension arms connected to the centre part by joints with a plurality of linkage sections which can be folded in to one another in the transport position and folded out to the working position and which are connected by joints. The centre part is arranged such that it can be moved along a vertical axis to adjust the height of the distributor linkage. At least one hydraulic device is associated with each extension arm, whereby the respective extension arm can be pivoted about a horizontal axis. At least three sensors for determining the distance between the centre part and the respective extension arm and the ground are also assigned to the distributor linkage, and the system has a data processing unit which is configured in such a way that the signals from the sensors are processed as actual values and on the basis of which an actuating signal for the hydraulic device is generated for adaptation to a target distance. The target distance for the pivoting of the extension arms is formed by the actual value of the centre part.

The invention has the advantage that, in particular in the event of a sudden change in the height of the distributor linkage or a sudden bending or angling of the extension arms, for example as a result of driving over unevenness in the field soil to be worked, the inertia effects of the distributor linkage can be compensated more efficiently than with a fixed actual value for each individual linkage section or extension arm. By adjusting the target distance for pivoting the extension arms to the current actual value of the centre part, it is possible for the two extension arms to reach the target distance to the ground almost simultaneously with the centre part. As a result, there is no need for any additional bending or angling of the extension arms after the target distance of the centre part has been reached.

In particular, if there is a sudden change in the actual value compared to the target value of the centre part, the advantage is that the inclination of the extensions arms can be kept constant, since the target value specifications of the lateral extension arms are not considered absolute but relative to the actual value of the centre part. In other words, if there is a sudden change in the height of the entire distributor linkage, the distance between the centre part is reset to the correct actual value. Since the target values of the extension arms are only considered relative to the actual value of the centre part, the actual value of the entire extension arm is adjusted to the target value by a corresponding change in height of the centre part, which also causes a change in height of the extension arms due to the connection between the extension arms and the centre part. Compared to the state of the art, this has the advantage that it is not necessary to adjust the centre part and the two extension arms separately to the desired target distance, so that the centre part and the two extension arms, for example, would be raised or bent and when the correct height of the centre part has been reached, the extension arms would then be angled again in opposite directions or the ends lowered. This means that generally a smaller inclination adjustment of the extension arms is required. This means that the forces acting on the extension arms and thus also on the distributor linkage can be significantly reduced. This allows the distributor linkage to be held as quickly as possible in a parallel position to the field soil to be cultivated, and the distributor linkage can adapt as efficiently as possible to different ground contours.

Preferred embodiments of the invention are indicated in the subclaims.

In the case of a preferred embodiment of the invention, the target distance for pivoting the extension arms can be dynamically adapted to the current actual value of the centre part by the data processing unit. In other words, the target value for the two extension arms is varied depending on the current actual value of the centre part. The target distance for the pivoting of the extension arms is therefore a value which changes continuously depending on the actual value of the centre part. Since the target value for the two extension arms can be adjusted dynamically and therefore depending on the situation, an optimized control of the pivoting of the two extension arms can be achieved. Therefore, when the extension arms are bent and angled in comparison to a fixed target value for the extension arms, lower reset forces must be applied to pivot the extension arms and thus to return the distributor linkage to a parallel position to the field soil.

Preferably the current actual value of the centre part and/or the extension arm is formed by the respective distance to the ground measured by the sensors. Since the distributor linkage typically has a constant application rate of the seed or plant protection agent over time, the change in the vertical displacement of the extension arms to the ground is decisive for a homogeneous distribution of the material. It is therefore particularly advantageous to counteract any inclination of the extension arm or height adjustment of the distributor linkage that occurs, and therefore to adjust the distance to the ground to a controlled target value. The distance to the ground measured by the sensors offers a direct and robust value for the actual value for target value adjustment in the data processing unit.

In a particularly preferred embodiment, the sensors are designed as ultrasonic sensors and/or optical sensors and/or radar sensors. The sensors can be mounted on the side of the extension arm facing the ground and on the distributor linkage. Thus, the sensors detect a direct value for the current distance to the ground. In particular, the design of the sensors as ultrasonic sensors and/or radar sensors has the advantage that a very robust measurement of the distance to the ground can be made. It is also possible to design the sensors in such a way that the plant population can be penetrated by the electromagnetic radiation emitted by the sensor and thus the distance measurement to the ground can be further specified. Preferably radar sensors are very stable against external influences such as dirt and impurities, rain, fog or heat. Therefore, radar sensors can also be installed in the immediate vicinity of the spray liquid, which is applied from the spray nozzles, in order to optimally determine the distance to the ground.

In a further embodiment, the current actual value of the centre part can be detected via a plurality of sensors arranged on the centre part. This means that the distance between the distributor linkage and the ground to be cultivated can be measured via a plurality of sensors. This has the advantage that, especially in the event of failure of a single sensor, the pivoting of the extension arm and/or the distributor linkage can still be controlled. In addition, by using a plurality of sensors to measure the distance to the ground, the current actual value of the centre part can be corrected if necessary.

Preferably the current actual value of the centre part is detectable by averaging in the data processing unit by the plurality of sensors at the centre part. As an example, the current actual value of the centre part can be detected via an average value of two sensors attached to the centre part. This has the advantage that in case of a failure of an individual sensor or a faulty measurement of a sensor, a precise current actual value of the centre part can be determined. Measurement inaccuracies of the sensors can thus be compensated efficiently. This guarantees an efficient and fast pivoting of the extension arms and thus an adaptation of the distributor linkage to different ground contours.

Furthermore, the actual values determined by the sensors of the extension arms can preferably be adapted by the data processing unit via averaging to the target distance of the centre part, in particular to the current actual value of the centre part. This has the advantage that a plurality of sensors can be attached to the distributor linkage and to the extension arms and an actual value of the respective extension arm can be detected by averaging the sensors. The more sensors are attached to the extension arms, the more accurately the current actual value of the extension arm can be determined. Therefore, the control can be further optimized and a robust value for the target value adjustment of the extension arms and the distributor linkage can be determined. The averaging over the plurality of sensors makes it possible to efficiently compensate or correct measurement inaccuracies or faulty measurements of individual sensors.

In another embodiment, a plurality of sensors are assigned to the respective extension arm and the current actual value of the respective extension arm is formed by the smallest distance to the ground measured by the sensors. In other words, the lowest measured value of the distance to the ground of the plurality of sensors can be used for bending or angling the extension arm of the distributor linkage. If, for example, a plurality of sensors determine a different actual value of an extension arm, the use of the smallest value measured by the sensors has the advantage that a minimum distance to the ground can be continuously compensated and therefore the distributor linkage or the extension arms do not come into contact with the ground.

Furthermore, preferably based on the measurement signals of the sensors, the height adjustment of the distributor linkage and/or the pivoting of the extension arms can be adjusted by the data processing unit via the hydraulic device. The measurement signals of the sensors can be used as directly determined actual values by the data processing unit or evaluated by averaging. Accordingly, the data processing unit has a control and/or evaluation program so that the measurement signals of the sensors can be processed. The data processing unit can be composed of known computer-aided systems which can carry out a target value/actual value comparison and thus generate a control signal for the hydraulic devices on the basis of this comparison. This allows precise and fast height adjustment and/or pivoting of the extension arms.

In a particularly preferred embodiment, the hydraulic device comprises a hydraulic cylinder, in particular a double-acting hydraulic cylinder, a hydraulic line which is connected to the hydraulic cylinder for supplying hydraulic fluid, and at least one hydraulic valve unit for adapting a cylinder position, the valve unit being adjustable via a control signal of the data processing unit. The use of a hydraulic fluid has the well-known advantage that the friction within the hydraulic device can be reduced and at the same time corrosion protection is ensured. The hydraulic device can generally be designed as an actuator to convert the control signals of the data processing unit into a mechanical movement. The position of the piston of the hydraulic cylinder can preferably be controlled. For example, when bending the extension arms, a greater pressure can be created by supplying hydraulic fluid to the hydraulic cylinder controlled by the hydraulic valve unit, causing the cylinder position of the hydraulic cylinder to shift. The hydraulic valve unit advantageously provides safe and fast-acting overload protection for the hydraulic cylinder. Overall, the cylinder position or the hydraulic pressure at the hydraulic cylinder can be optimally adjusted by means of the hydraulic valve unit, which can be controlled by the data processing unit via the control signal.

In another particularly preferred embodiment, the at least one hydraulic valve unit is formed by a proportional valve. As an example, the proportional valve can be designed as a four-way valve. It is also conceivable to form the hydraulic valve unit by means of a pressure control valve or other circuits to change the applied hydraulic pressure or to change the cylinder position of the hydraulic cylinder. The hydraulic valve unit can be adjusted using a known characteristic curve. The characteristic curve of the valve unit represents the functional dependence of the output signal on the input signal. The ideal characteristic curve would be formed by a straight line, wherein the output signal changes linearly with the pressure as input signal. By adjusting the hydraulic valve unit on the basis of its characteristic curve, the hydraulic cylinder can be adjusted efficiently and as quickly as possible in order to cause the extension arm to pivot or the distributor linkage to be adjusted in height.

It is well known that the hydraulic line connected to the hydraulic cylinder for pivoting the extension arms can be connected to a hydraulic accumulator. It is conceivable here that the control system comprises a central hydraulic accumulator or alternatively that one hydraulic accumulator each is assigned to the right-hand or left-hand extension arm of the distributor linkage. Advantageously, the pressure acting in the hydraulic cylinder is generally generated by the hydraulic accumulator. It is particularly advantageous if a common hydraulic line is provided for the hydraulic circuit. This allows a closed hydraulic circuit to be formed in the control system.

In a particularly preferred embodiment, the data processing unit forms a unit with the sensors and at least one hydraulic device. This provides a direct connection, for example via cable lines or wirelessly, between the sensors and the data processing unit as well as the hydraulic device. Therefore, the measured signals determined by the sensors can be transmitted to the data processing unit as quickly as possible and a control signal can be efficiently generated by the data processing unit via a target value/actual value comparison, whereby the hydraulic device for pivoting the extension arms or for height adjustment of the distributor linkage can be controlled.

In the context of the present application, an agricultural utility vehicle is also claimed for the application of material such as fertilisers, plant protection agents or seed with a control system according to one of the preceding embodiments.

Furthermore, the present application discloses a method for the control of an agricultural utility vehicle, with a distributor linkage for applying material, such as fertiliser, plant protection agent or seed, which extends transversely to the direction of travel and has a centre part and two lateral extension arms connected to the centre part, with a plurality of linkage sections which can be folded in relative to one another in the transport position and folded out in the working position and are connected by joints. The centre part for the height adjustability of the distributor linkage is movably arranged along a vertical axis and at least one hydraulic device is associated with each extension arm, whereby the respective extension arm can be pivoted about a horizontal axis. Furthermore, at least three sensors for determining the distance between the centre part and the respective extension arm and the ground are assigned to the distributor linkage, and the system furthermore has a data processing unit which is configured in such a way that the signals of the sensors are processed as actual values and on the basis of which an actuating signal for the hydraulic device is generated for adaptation to a target distance. The pivoting of the extension arms is based on the target distance, which is formed by the actual value of the centre part.

Further preferably the target distance for the pivoting of the extension arms is dynamically adapted to the actual value of the centre part by the data processing unit.

The current actual value of the centre part is detected by a plurality of sensors arranged on the centre part.

In a further embodiment, the current actual value of the centre part is detected by the plurality of sensors on the centre part through averaging in the data processing unit.

Preferably, the actual values determined by the sensors of the extension arms are adapted by the data processing unit via averaging to the target distance of the centre part, which is formed by the current actual value of the centre part.

In a further embodiment, the height adjustment of the distributor linkage and/or the pivoting of the extension arms is set by the data processing unit via the hydraulic device based on the measurement signals of the sensors.

With regard to the advantages of the method for the control of an agricultural utility vehicle, reference is made to the advantages explained in connection with the control system.

The invention is explained in more detail below with reference to the attached schematic drawings. The embodiments shown are only examples of how the control system according to the invention can be designed and do not represent a conclusive limitation.

Figure 1:
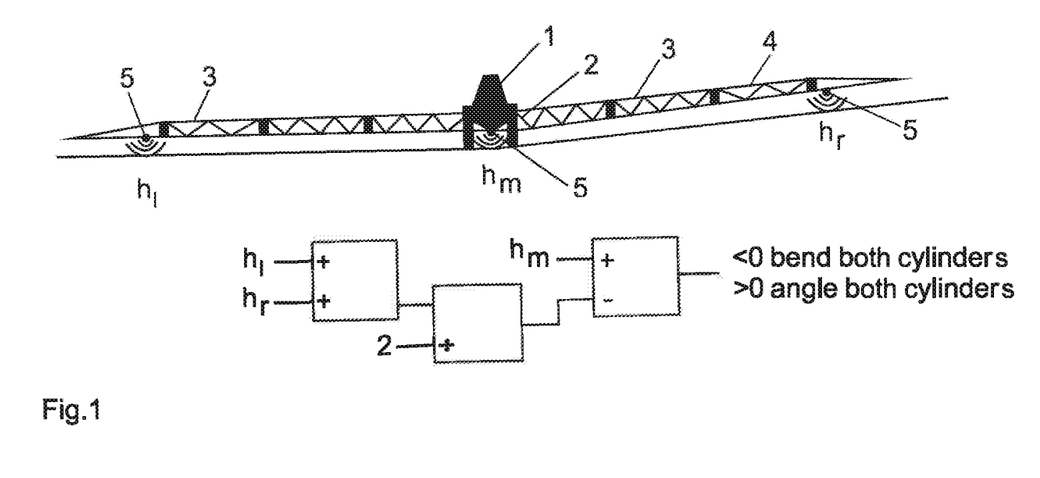
FIG. 1 shows a schematic view of a control system according to the invention for the angular position of the extension arms with a distributor linkage according to a first embodiment.

FIG. 1 shows a schematic view of a control system for an agricultural utility vehicle 1 according to a first embodiment. The control system comprises a distributor linkage 4 for applying material such as fertiliser, plant protection agents or seed, which extends transversely to the direction of travel. The distributor linkage 4 has a centre part 2 and two lateral extension arms 3 connected to the centre part 2 by joints. The lateral extension arms, which are connected by joints 3 comprise several linkage sections which can be folded to each other in transport position and folded out in working position. The centre part 2 is arranged so that it can be moved along a vertical axis in order to adjust the height of the distributor linkage 4. Each of the two lateral extension arms 3 is associated with at least one hydraulic device, which is not shown, whereby the respective extension arm 3 can be pivoted about a horizontal axis. Three sensors 5 are assigned to distributor linkage 4. One sensor 5 is arranged on the centre part, and the other two sensors 5 are assigned to the respective outer end of the right-hand and left-hand extension arm 3. The sensors 5 are attached to the lower edge of the respective extension arm 3 and the middle part 2. The sensors 5 can measure the current distance of the respective extension arm and the centre part to the ground. The sensors 5 are designed for instance as ultrasonic sensors or radar sensors for this purpose.

The measured distance to the ground is defined for the left hand extension arm 3 by the height $h_l$, and equivalent for the right hand extension arm 3 by the height $h_r$. The measured distance to the bottom of the centre part 2 is equally defined by the height $h_m$.

Furthermore, the control system has a data processing unit, which is not shown, which is configured such that the signals of the sensors 5 are processed as actual values and on the basis of which a control signal for the hydraulic devices, which is not shown, can be generated for adaptation to a target distance. For this purpose, the data processing unit may have a control and/or evaluation program and generally be formed as a computer-aided system. The measurement signals of the sensors 5 can be transmitted to the data processing unit via cable connections or wirelessly.

Figure 2:
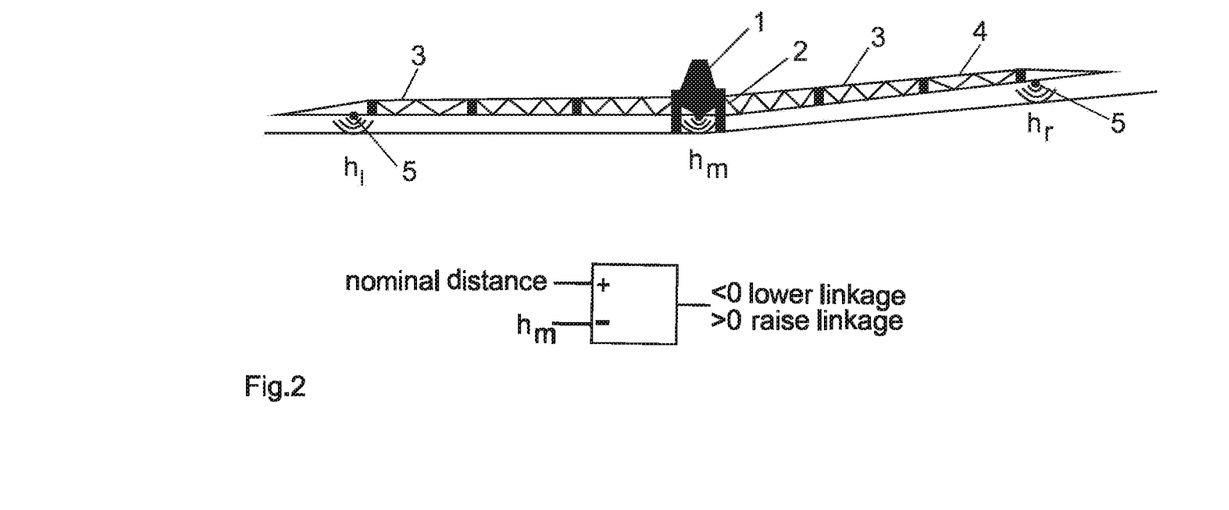
FIG. 2 shows a schematic view of a control system according to the invention for the position of the centre part with a distributor linkage according to the first embodiment.
Figure 3:
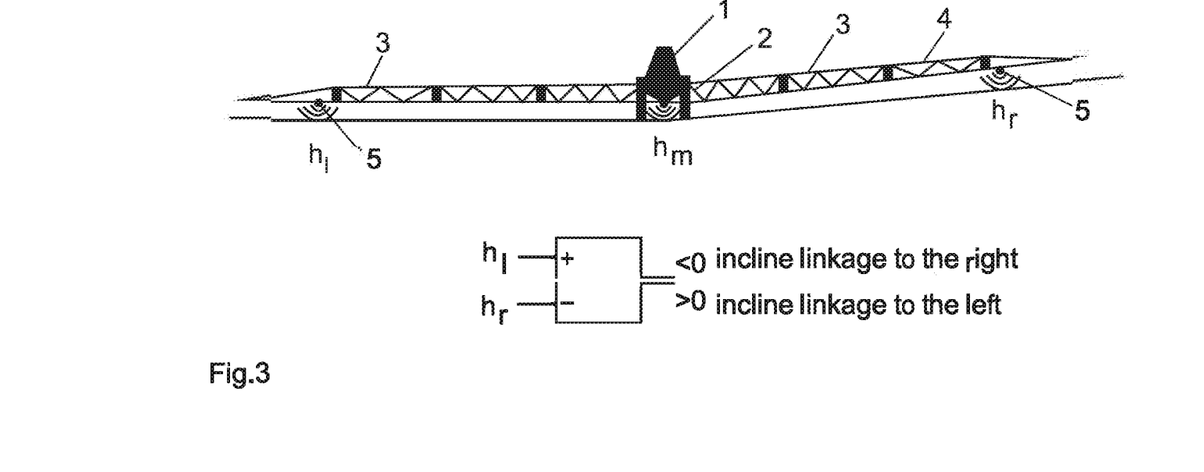
FIG. 3 shows a schematic view of a control system according to the invention for the distributor linkage inclination with a distributor linkage according to the first embodiment.

The control of the distributor linkage configuration, i.e. the height of the centre part 2, the angle of attack of the extension arms 3 as well as the inclination of the entire distributor linkage is carried out by means of three control processes, which are shown in FIGS. 1 to 3. These processes preferably run simultaneously, but can also be carried out one after the other.

The data processing unit is configured in such a way that from the measured distances to the bottom of the two extension arms 3, i.e. the measured values $h_l$ and $h_r$, the actual values are processed in a first control process. A mean value is formed from the measured values $h_l$ and $h_r$. This mean value is compared with the current actual value of the centre part 2. The current actual value of the centre part 2 is formed by the measured distance $h_m$. If the mean value of the two extension arms 3 deviates from the current actual value of the centre part 2, in other words if there is a control difference, the data processing unit can generate a control signal for the hydraulic devices for pivoting the extension arms 3. The target distance for pivoting the extension arms 3 is therefore formed by the current actual value of the centre part 2.

The hydraulic device, which is not shown, associated with each extension arm 3, may advantageously comprise a hydraulic cylinder, in particular a double-acting hydraulic cylinder, a hydraulic line connected to the hydraulic cylinder for supplying hydraulic fluid, and at least one hydraulic valve unit for adjusting a cylinder position. The hydraulic valve unit can be adjusted via a control signal from the data processing unit. If there is a positive control difference between the current actual value of the centre part 2 and the mean value of the two measured distances to the bottom of the extension arm 3, the data processing unit can generate a control signal for the hydraulic devices of the extension arm 3, whereby the two hydraulic cylinders of the extension arm 3 are bent. In case of a negative control deviation, both hydraulic cylinders of the two extension arms 3 can be angled. Therefore, based on the control signal of the data processing unit, a pivoting of the two extension arms 3 is effected.

As an example, when the agricultural utility vehicle 1 is driven over uneven ground, the measured distance to the ground of the right-hand and left-hand extension arms 3 and 2 can be 100 cm everywhere. The target distance of the distributor linkage 4 to the ground can therefore also be 100 cm. If the agricultural utility vehicle 1 runs over an unevenness in the ground, both the centre part 2 and the two extension arms 3 may lower. For example, the measured distance to the ground of the centre part 2 may lower from a height $h_m$=100 cm to a height $h_m$=80 cm. In the same way, the height of the two extension arms 3 can for instance be reduced from $h_l$=$h_r$=100 cm to $h_l$=$h_r$=80 cm.

Due to the deflection of the distributor linkage 4 from its initial position, the data processing unit can generate a control signal for a hydraulic device for the height adjustability of the distributor linkage 4, whereby the entire distributor linkage 4 is raised again to the target distance specification $h_m$=100 cm. The centre part can be moved along a vertical axis for height adjustment.

The target distance for pivoting the extension arms 3 is formed by the current actual value of the centre part 2. This means that initially the target distance for the pivoting of the extension arms 3 is formed by the value $h_m$=80 cm of the deflection of the centre part 2 which occurred. Contrary to the state of the art, the extension arms are not bent and/or angled, since the target distance of the extension arms 3 is formed by the actual distance of the centre part according to the invention, and thus the target distance of the extension arms is reduced from 100 cm to 80 cm corresponding to the actual distance of the centre part. Due to the target value specification of the centre part 2 of 100 cm, the target distance for pivoting the extension arms 3 is therefore dynamically adapted to the current actual value of the centre part 2. This means that the pivoting of the extension arms 3 is adapted to the height control of the centre part 2. In other words, the pivoting of the extension arms 3 is dependent on the change in the current actual value of the centre part 2. This has the advantage that the pivoting of the extension arms 3 requires a lower force or time than if the pivoting of the extension arms should reach a set target value of 100 cm. Therefore, lower forces are preferably applied to the entire distributor linkage 4 when driving over uneven ground. Furthermore, an additional bending/angling of the extension arms 3 can be efficiently avoided, which can result from inertial forces of the entire distributor linkage 4. Therefore, the extension arms 3 are not bent first and then angled after the centre part has reached its target value again, as is the case with a fixed absolute target value for extension arms 3. This means that optimized control of the pivoting of the two extension arms 3 can be achieved. In other words, the lifting gear of the centre part for height adjustment always influences the value of $h_m$, $h_l$, and $h_r$ identically. If they all deviate by the same value, it is therefore advantageous to move the lifting gear and leave the hydraulic cylinders to rest in order to bend/angle the extension arms 3. Otherwise the extension arms 3 and the centre part 2 may move in opposite directions.

FIG. 2 shows a schematic view of a control system for the height control of the centre part of an agricultural utility vehicle 1 according to the first embodiment for the execution of the second control procedure. The control system has a distributor linkage 4 for applying material, such as fertiliser, plant protection agents or seed, which extends transversely to the direction of travel. The distributor linkage 4 also comprises a centre part 2 and two lateral extension arms 3 connected to the centre part 2 by joints. The centre part 2 is arranged so that it can be moved along a vertical axis to adjust the height of the distributor linkage 4. Each of the two lateral extension arms 3 is associated with at least one hydraulic device, which is not shown, whereby the respective extension arm 3 can be pivoted about a horizontal axis. Three sensors 5 are assigned to the distributor linkage, whereby the distance of the centre part 2 and the respective extension arm 3 to the ground can be determined. For this purpose the sensors 5 are each arranged at the lower edge of the centre part 2 and at the lower edge of the right-sided and left-sided extension arm 3. The sensors 5 can be designed for distance measurement as ultrasonic sensors or as radar sensors.

If the agricultural utility vehicle 1 should drive over an unevenness in the ground, and the distributor linkage 4 should therefore be raised or lowered, the currently determined actual value of the centre part 2, which is determined by the actual distance to the ground $h_m$, changes. The actual values currently determined by the sensors 5 for the actual distance of the extension arms 3 and the centre part 2 from the ground are transmitted to a data processing unit, which is not shown, which is configured in such a way that the measured signals of the sensors 5 are processed as actual values and on the basis of which a control signal for the respective hydraulic device of the extension arms 3 is generated for adaptation to a target distance.

The data processing unit can carry out a target value/actual value comparison if the current actual value of the centre part deviates by 2 $h_m$ from a target distance specified by a user. In other words, the difference between the target distance of the distributor linkage 4 and the currently measured actual value of the centre part 2 $h_m$ is calculated and the distributor linkage 4 is raised or lowered due to this control difference. This corresponds to a height adjustment of the entire distributor linkage 4, in particular of the extension arms 3, based on the specified target distance.

FIG. 3 shows a third control procedure for adjusting the inclination of the distributor linkage. Here a difference formation of the distance values determined by the sensors 5 is carried out. The distance of both extension arms to the ground should be as identical as possible and correspond to the actual distance $h_m$ of the centre part. In the ideal case, the result of the difference formation is therefore 0. The result of the difference formation therefore serves to control the rotation about an axis lying in the direction of travel. For this purpose an actually known actuator, which is not shown, is provided, and which rotates the extension arm as a whole around the axis clockwise or counterclockwise, depending on the sign of the result of the difference formation, until the measuring signals $h_l$ and $h_r$ of the sensors 5 on the extension arms are identical.

In summary, the adjustment of the position of the distributor linkage is carried out in three steps:
1. The extension arm is bent an angled in such a way that the distance between the extension arm sides and the ground corresponds on average to the distance between the centre part and the ground.
2. The height of the distributor linkage is adjusted by measuring the distance between the centre part and the ground and adjusting it to a target distance.
3. The inclination of the distributor linkage is adjusted by rotating the entire distributor linkage about an axis in the direction of travel until the distances $h_l$ and $h_r$ are identical.

In this way the three parameters angle of attack of the extension arms, height and inclination of the distributor extension arm can be set independently. The advantage of this control over conventional height control of each individual section of the distributor linkage is that the various control processes, in particular the control of the angle of attack and the height, cannot work against each other.

Figure 4:
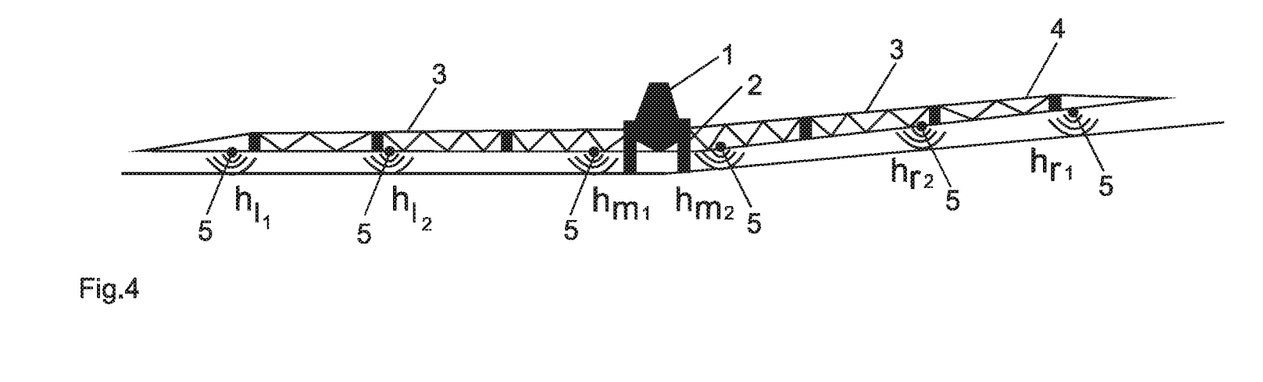
FIG. 4 shows a schematic view of a control system according to the invention with a distributor linkage according to a further embodiment.

FIG. 4 shows a schematic view of a control system according to the invention according to another embodiment. The control system for an agricultural utility vehicle 1 comprises a distributor linkage 4 for applying material such as fertiliser, plant protection agents or seed, which extends transversely to the direction of travel and has a centre part 2 and two lateral extension arms 3 connected to the centre part. The centre part 2 is arranged to be movable along a vertical axis for height adjustment of the distributor linkage 4 and each extension arm 3 is assigned at least one hydraulic device, which is not shown. This allows the respective extension arm 3 to be pivoted about a horizontal axis.

Six sensors 5 are assigned to the distributor linkage. The sensors 5 can, for example, be designed as ultrasonic sensors or radar sensors. It is also conceivable that the sensors 5 are designed as optical sensors. The sensors 5 detect a current distance between the distributor linkage 4 and the ground. Two sensors 5 are assigned to the centre part 2 on the right and left side, and two sensors 5 are assigned to each of the right and left side extension arms 3. Accordingly, the distance between the centre part 2 and the right-hand and left-hand extension arm to the ground to be worked can be determined using a plurality of sensors. As an example, the current distance to the bottom of the centre part 2, i.e. the current actual value of the centre part 2, can be measured via the two sensors 5 which are assigned to the centre part 2.

These two sensors 5 each detect a distance to the ground $h_{m1}$ and $h_{m2}$ on the right and left side of the centre part 2.

The control system further comprises a data processing unit, which is not shown, which is configured such that the signals of the sensors 5 are processed as actual values and on the basis of which a control signal can be generated for the hydraulic devices of the extension arms 3 for adaptation to a target distance. The data processing unit can therefore determine a mean value for the current actual value of the centre part from the two measured distances to the ground $h_{m1}$ and $h_{m2}$.

In the same way a mean value of the measured distances to the ground of the two sensors, $h_{l1}$ and $h_{l2}$, as well as $h_{r1}$ and $h_{r2}$, assigned to the respective extension arm 3, can be determined for the right-hand and left-hand extension arm 3. Alternatively, the smallest measured distance of the respective sensors 5 can be used for the measurement of $h_{l1}$ and $h_{l2}$, as well as $h_{r1}$ and $h_{r2}$ from the data processing unit for the two extension arms 3. For the respective pivoting of the extension arms 3, the actual value of the respective extension arms 3 currently determined can thus be compared with the actual value of the centre part 2, and a control signal can be generated by the data processing unit based on this.

The averaging of the plurality of sensors 5 on the respective extension arm 3 and the centre part 2 has the advantage that a precise value for the current actual value of the extension arm 3 and the centre part 2 can be detected. Likewise, in the event of incorrect measurements of a single sensor 5, an exact value for the current actual value can still be detected. This means that the pivoting of the extension arm 3 can be efficiently controlled even if a single sensor 5 fails.

REFERENCE NUMERAL LIST 1 agricultural utility vehicle
2 centre part
3 extension arms
4 distributor linkage
5 sensor

The invention claimed is:

1. A control system for an agricultural utility vehicle, comprising:
   a distributor linkage for applying material, the distributor linkage extending transversely to a direction of travel, and comprising a center part and two lateral extension arms which are connected to the center part by joints and having a plurality of linkage sections connected by additional joints, which are configured to be folded in relative to one another in a transport position and folded out in a working position,
   wherein the center part is arranged movably along a vertical axis for height adjustability of the distributor linkage,
   wherein at least one hydraulic device is assigned to each of the extension arms, whereby a respective one of the extension arms is configured to be pivoted about a horizontal axis, wherein at least three sensors are assigned to the distributor linkage,
   wherein a first sensor is configured to determine a first distance, the first distance being between the center part and the ground;
   wherein a second sensor is configured to determine a second distance, the second distance being between a first lateral extension arm and the ground;
   wherein a third sensor is configured to determine a third distance, the third distance being between a second lateral extension arm and the ground;
   wherein the control system comprises a processor which is configured such that measurement signals of the sensors are processed as actual values so as to generate an actuating signal for the hydraulic device for adaptation to a target distance, and
   wherein the target distance for pivoting the extension arms is formed by a current actual value of the center part, and
   wherein the processor is configured to:
      calculate a mean value from the actual values representative of the second distance and the third distance; and
      compare the mean value with the current actual value of the center part.

2. The control system according to claim 1, wherein the target distance for pivoting the extension arms is configured to be adapted dynamically to the current actual value of the center part of the processor.

3. The control system according to claim 1, wherein the first sensor, the second sensor, and the third sensor are at least one of ultrasonic sensors, optical sensors, or radar sensors.

4. The control system according to claim 1, wherein the current actual value of the center part is detectable via a plurality of sensors arranged on the center part.

5. The control system according to claim 4, wherein the current actual value of the center part is detected by the plurality of sensors on the center part by averaging in the processor.

6. The control system according to claim 1, wherein at least one of the second sensor or the third sensor comprises a plurality of sensors and a current actual value of at least one of the first lateral extension arm or the second lateral extension arm is formed by a smallest distance to the ground measured by the second sensor or the third sensor.

7. The control system according to claim 1, wherein, based on the measurement signals of at least one of the first sensor, the second sensor, or the third sensor, at least one of a height adjustment of the distributor linkage or pivoting of the extension arms is set by the processor via the hydraulic device.

8. The control system according to claim 1, wherein the hydraulic device comprises a hydraulic cylinder, a hydraulic line which is connected to the hydraulic cylinder for supplying hydraulic fluid, and at least one hydraulic valve unit for adapting a cylinder position, the valve unit being adjustable via an actuating signal of the processor.

9. The control system according to claim 8, wherein the hydraulic valve unit is formed by a proportional valve.

10. The control system according to claim 8, wherein the processor forms a single unit with the first sensor, the second sensor, the third sensor and the hydraulic device.

11. An agricultural utility vehicle for applying material, comprising:
    the control system according to claim 1.

12. A method for controlling an agricultural utility vehicle comprising:
    applying material, by a distributor linkage, the distributor linkage extending transversely to a direction of travel, and comprising a center part and two lateral extension arms which are connected to the center part by joints and having a plurality of linkage sections connected by additional joints which are configured to be folded in relative to one another in a transport position and folded out in a working position, wherein the center part is arranged movably along a vertical axis for height adjustability of the distributor linkage, wherein at least one hydraulic device is assigned to each of the extension arms, whereby a respective one of the extension arms is configured to be pivoted about a horizontal axis, wherein at least three sensors are assigned to the distributor linkage, wherein a first sensor is configured to determine a first distance, the first distance being between the center part and the ground;

wherein a second sensor is configured to determine a second distance, the second distance being between a first lateral extension arm and the ground;

wherein a third sensor is configured to determine a third distance, the third distance being between a second lateral extension arm and the ground;

wherein the control system comprises a processor which is configured such that measurement signals of the sensors are processed as actual values so as to generate an actuating signal for the hydraulic device for adaptation to a target distance, and wherein pivoting of the extension arms is based on the target distance which is formed by the current actual value of the center part, and wherein the processor is configured to:
calculate a mean value from the actual values representative of the second distance and the third distance; and
compare the mean value with the current actual value of the center part.

13. The method according to claim 12,
wherein the target distance for pivoting the extension arms is dynamically adapted to the current actual value of the center part by the processor.

14. The method according to claim 12,
wherein the current actual value of the center part is detected via the a plurality of sensors arranged on the center part.

15. The method according to claim 12,
wherein the current actual value of the center part is detected by the plurality of sensors on the center part by averaging in the processor.

16. The method according to claim 12,
wherein, based on the measurement signals of at least one of the first sensor, the second sensor, or the third sensor, at least one of a height adjustment of the distributor linkage or the pivoting of the extension arms is set by the processor via the hydraulic device.

17. The control system according to claim 1, wherein the material applied by the distributor linkage is at least one of fertilizer, plant protection agent, or seed.

18. The method according to claim 12, wherein the material applied by the distributor linkage is at least one of fertilizer, plant protection agent, or seed.

19. The control system according to claim 1, wherein, if the mean value of the two extension arms deviates from the current actual value of the center part, the processor is configured to generate a control signal for the hydraulic devices for pivoting the extension arms.

20. The method according to claim 12, wherein, if the mean value of the two extension arms deviates from the current actual value of the center part, the processor is configured to generate a control signal for the hydraulic devices for pivoting the extension arms.

* * * * *